UNITED STATES PATENT OFFICE.

WILLIAM BURTON, OF PLYMOUTH, WISCONSIN.

PROCESS OF DESTROYING CANADA THISTLES.

SPECIFICATION forming part of Letters Patent No. 464,092, dated December 1, 1891.

Application filed July 28, 1890. Serial No. 360,234. (No specimens.)

*To all whom it may concern:*

Be it known that I, WILLIAM BURTON, of Plymouth, in the county of Sheboygan and State of Wisconsin, have invented a new and useful Improvement in Processes for Destroying Canada Thistles, of which the following is a description.

The object of my invention is to provide a method or process of treatment of Canada thistles and other noxious weeds by applying thereto in a prescribed manner certain plant-life-destroying compounds and substances for effectually destroying them.

It is well known that Canada thistles are very tenacious of life, and that they have roots which penetrate and run in the ground long distances, and that these roots are provided with buds at distances apart, which when a portion of the root is killed are still liable to sprout and produce a new and independent plant or thistle coming to the surface of the ground many feet from the parent stalk, and that thus the plant propagates itself indefinitely to the great injury of valuable plants and grasses and to the dismay of the farmer. It is also well known that various means have been used in attempts which have generally been unsuccessful to destroy this undesirable plant. Plowing the land repeatedly and building fires on the surface of the ground have been tried, and except in very compact clay ground have failed to kill them. Solutions and compounds which are ordinarily destructive of plant life have been repeatedly applied to these Canada thistles with no greater success than merely to destroy the leaf top of the plant or perhaps a short section of its root, failing entirely to destroy the larger part of the root, and leaving the buds on the root at a distance from the original plant to spring into life and come to the surface of the ground and develop a thistle of full proportions.

To kill the root of the plant at any considerable distance from the parent stalk, some life-destroying article or compound of so volatile a nature as to be capable of following the root, penetrating its fibers to a long distance, is required for its destruction. To accomplish this I use a compound which consists of naphtha, a product of distillation of petroleum, and naphthaline dissolved in the naphtha, to which I preferably add a small quantity of pulverized alkanet-root. These several ingredients I unite in the following proportions, to wit: one gallon of naphtha, into which is introduced one ounce of naphthaline and preferably about one-fourth of an ounce of alkanet-root. Naphtha will dissolve a somewhat larger quantity of napthaline than above indicated; but, as in the use of the compound a certain portion of the naphtha evaporates, I have found that if a very much larger proportion of naphthaline is used the compound, when applied to the roots of the plant, fails to penetrate the roots as far as is necessary to kill it, as the excess of naphthaline is liable to result in a crystallization of the compound in the root near the surface of the ground, thereby preventing the compound from following the fiber of the root to such distance as is desirable. The alkanet-root is also a desirable element of the compound, as, besides any chemical action it may have in connection with the other ingredients of the compound, it so colors it as to enable the user to clearly see where the compound has been applied, which is very desirable where a large patch of thistles is being eradicated.

The method to be pursued in destroying Canada thistles with the compound is as follows: First advisably cut off the top of the thistle at or below the surface of the ground, and with a can or vessel having a long tapering and preferably crooked nozzle like an oil-can, in which the above-described compound is contained, pour a small amount of the compound, preferably about a spoonful, into the center of the root of the plant. Thereupon deposit on the top of the root a small amount of dry chloride of sodium, or common salt. This salt will not be dissolved by the compound, as oil is not a solvent of salt, and the salt remaining on the top of the root will prevent the evaporation of the volatile parts of the compound and will ultimately be dissolved by rain or dew and, entering the fibers of the root, will aid in forcing the compound ahead of it more deeply or farther into the root, thus by its connection in both manners aiding the process of the destruction of the root.

While it is well known that certain plants are destroyed by the repeated application of salt thereto, still it is as well known that neither the application of salt nor the gnawing of the root by sheep, induced by the application of salt, has ever been successful in destroying Canada thistles.

What I claim as new, and desire to secure by Letters Patent, is—

1. The process of destroying Canada thistles or similar weeds by the application thereto, substantially as described, of the liquid product of petroleum known as "naphtha," with which naphthaline is combined in the proportions and in the manner hereinbefore set forth.

2. The process of destroying Canada thistles or similar weeds by the application thereto, substantially as described, of naphtha and naphthaline combined therewith in the proportion and in the manner described, followed by an application of chloride of sodium in the manner set forth.

In testimony whereof I affix my signature in presence of two witnesses.

WILLIAM BURTON.

Witnesses:
C. T. BENEDICT,
ANNA FAUST.